T. P. PAYNE.
MACHINE FOR MAKING DISTANCE RECORD DEVICES FOR METAL WORKING MACHINES.
APPLICATION FILED MAR. 2, 1914.

1,241,249.

Patented Sept. 25, 1917.
3 SHEETS—SHEET 2.

WITNESSES:
H. M. Bayles.
Alan M. Johnson

INVENTOR
T. P. Payne
BY
John D. Morgan
ATTORNEY

T. P. PAYNE.
MACHINE FOR MAKING DISTANCE RECORD DEVICES FOR METAL WORKING MACHINES.
APPLICATION FILED MAR. 2, 1914.
1,241,249.
Patented Sept. 25, 1917.
3 SHEETS—SHEET 3.
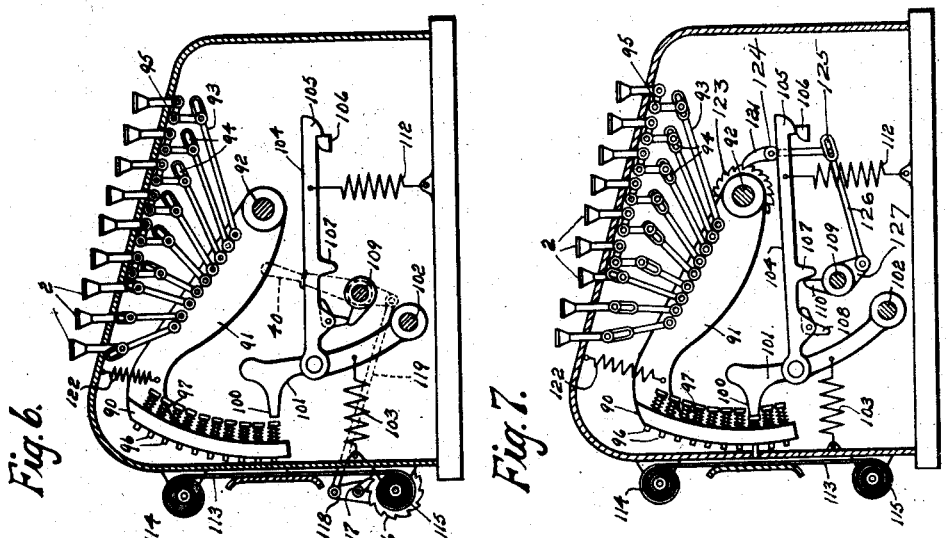
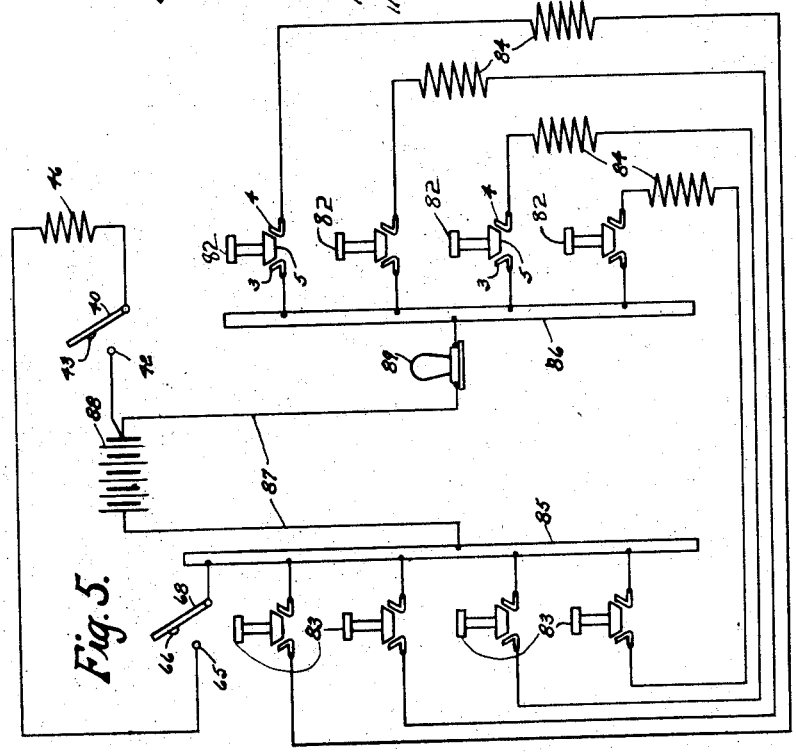
WITNESS
INVENTOR
T. P. Payne
BY
John D. Morgan
ATTORNEY

UNITED STATES PATENT OFFICE.

THEODORE P. PAYNE, OF NEWARK, NEW JERSEY, ASSIGNOR TO STEEL UTILITIES, INCORPORATED, A CORPORATION OF NEW YORK.

MACHINE FOR MAKING DISTANCE-RECORD DEVICES FOR METAL-WORKING MACHINES.

1,241,249.   Specification of Letters Patent.   Patented Sept. 25, 1917.

Application filed March 2, 1914. Serial No. 821,990.

*To all whom it may concern:*

Be it known that I, THEODORE P. PAYNE, a citizen of the United States, and a resident of Newark, N. J., have invented new and useful Improvements in Machines for Making Distance-Record Devices for Metal-Working Machines, of which the following is a specification.

The invention relates to machines for making distance record devices for metal working machines and more particularly to machines for making an automatically operating distance record device, such as a strip or sheet, which constitutes a permanent distance record device and is adapted to automatically control the travel and stopping of the shape or like work through the machine and relatively to the punching mechanism.

Objects of the invention are to produce a distance record device for automatically controlling a shape punching machine; to provide for making such distance record device in the form of a perforated sheet or strip; to provide against the making of errors in making the distance records, and more particularly to prevent the making of erroneous perforations in such a sheet or strip; to provide for making a record of the distances or dimensions recorded or perforated in the sheet or strip or like record device; to provide for making such a printed record; to provide for recording the total dimensional or distance values of the successive settings for a particular shape or other piece of work; to provide more especially for making such total record in printed form; to provide selective devices for setting the desired distance and to provide error preventing means in coöperation therewith; to provide such selective means in duplicate, each such means being operated independently by a different person, and identical settings thereof being prerequisite to making a record in the distance record device, such as the perforations in the sheet or strip; to provide a novel mechanism for effecting the various enumerated functions and objects. These and other objects of the invention will be set forth hereinafter in part, and in part will be obvious to those skilled in the art.

The invention consists in the novel parts, constructions, arrangements, combinations and improvements herein shown and described.

The accompanying drawings referred to herein, and forming a part hereof, illustrate one embodiment of the invention, and with the description, serve to explain the principles thereof.

Of the drawings:—

Fig. 5 is a wiring diagram; and Figs. 6 and 7 are elevations with certain parts in section, of the interior and details of the printing mechanism.

Referring by the way of example to the accompanying drawings, which illustrate one embodiment of the invention, means are provided for selectively setting the punches, or other means for making the distance indications, preliminary to the actual making of such indications, and in accordance with certain features of the invention in connection with such setting there is made a record, preferably a printed numerical record of such settings. Further, in accordance with certain aspects of the invention, and as embodied, in combination and coöperation with the foregoing, means are provided whereby the operator may at will cause the set indications, or setting for the indications, to be perforated or otherwise marked in the sheet or strip or other distance record device at a time subsequent to the setting. Further, in accordance with certain features of the invention, and to prevent erroneous perforations of other records to be made, duplicate setting devices, operable independently by different operators are provided, and as embodied same are shown in combination and coöperation with the other means and instrumentalities referred to.

Figure 1:
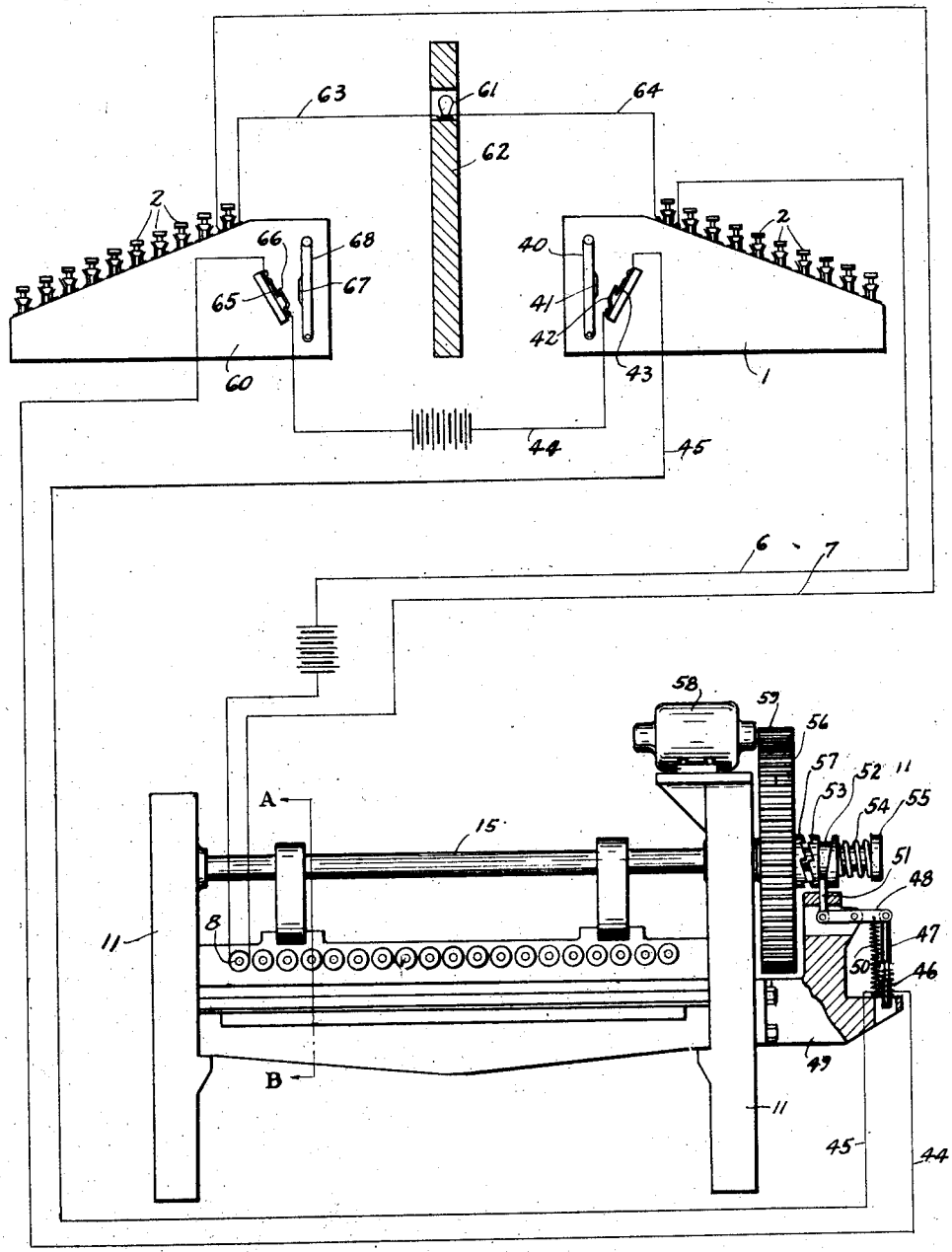
Figure 1 is an elevation, partly diagrammatic, of a machine embodying the invention.

Referring more particularly to Fig. 1, and to the selective or settable devices which control the making of the distance indications, the present embodiment comprises a calculating machine of the type or kind constructed and arranged to record distances and to add successive records of distances together. Commercial types of such machines are instanced by the "Wales" or "Burroughs" machine of this kind, which print and add feet and inches and fractions thereof. Such a machine is indicated by reference numeral 1.

Figure 2:
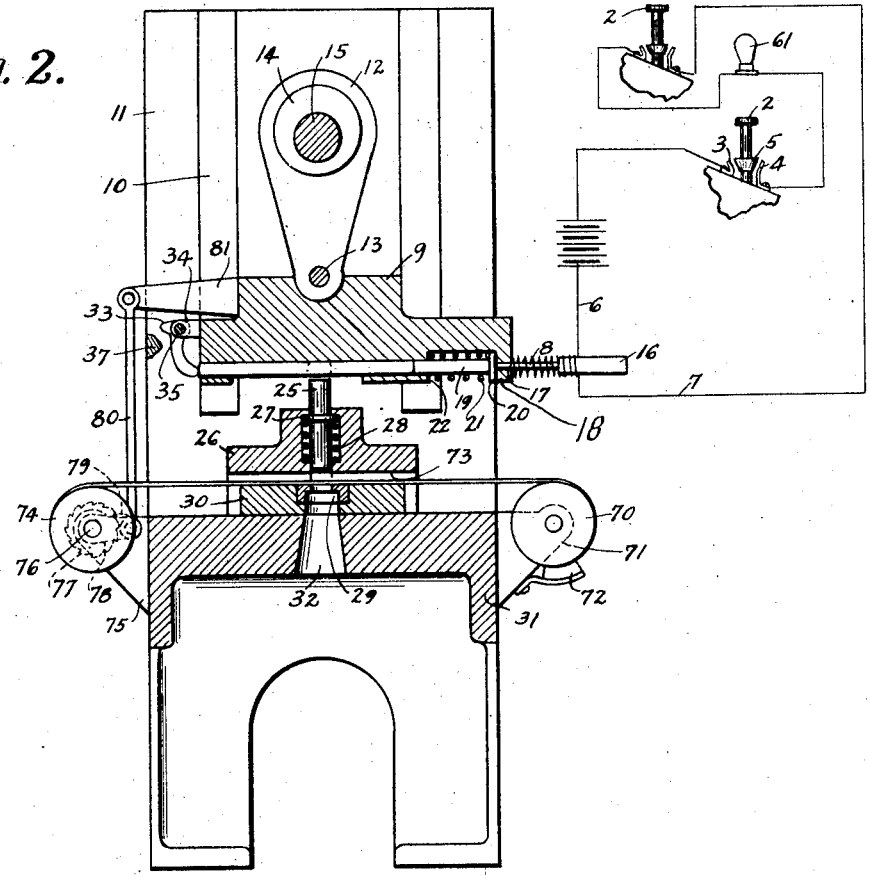
Fig. 2 is a section, on an enlarged scale, on the line A—B of Fig. 1 looking in the direction of the arrows.

The embodied form of device for making the distance indications comprises means for making perforations in a sheet or strip at various selected points in a line transversely of the sheet or strip, said line being either straight or staggered, and the position of a perforation transversely of the line being significant in the punching machine of a particular denomination and a particular numerical value in such distance denomination. As embodied, the series of keys 2 of the calculating machine 1, which keys represent the various distance values, are provided with contacts or terminals 3 and 4 adjacent thereto, which contacts or terminals are in an electrical circuit which controls the setting of gags or interponents in the punching machine. On the stem of each of the keys 2 is a bridge-piece 5, adapted to close the gap between the contacts 3 and 4. In circuit with the contacts 3 and 4 for each key by means of wires 6 and 7 (shown diagrammatically in both Figs. 1 and 2), is a solenoid 8. But one of said circuits is shown in the drawings, the others being of like arrangement.

The series of solenoids 8 are mounted on a reciprocating head 9, which head reciprocates on guideways 10 in a frame 11. Said head 9 is reciprocated by suitable means, such as links 12 pivotally connected at 13 to the head 9 and supported from eccentrics 14 carried upon a shaft 15 journaled in the frame 11. The head 9 is relatively long and carries the solenoids 8 in a row corresponding to the number of punches located transversely of the strip as it is fed through the machine.

The core 16 of each solenoid 8 has connected thereto a rod 17 reciprocable in a suitable aperture in a flange 18 fixed to or integral with the head 9. In alinement with each of the pins 17 a guideway is formed through the head 9, in which guideway a gag or interponent is slidable. Said gag or interponent comprises a part 19 provided with a head 20, which abuts upon the end of the rod 17, said part 19 being surrounded by a spring 21 in compression between the head 20 and a suitable surface 22 formed in the head 9, said spring being for the purpose of restoring the part 19 of the gag or interponent after it has been set.

The gag or interponent comprises also a slide or bar 23 separate from the part 19. Said part 23 is provided with a slot 24 formed internally thereof and open vertically therethrough.

A series of punches 25, corresponding to the keys 2, are arranged adjacent to and beneath the series of interponents or gags, said punches being in the form of rods mounted reciprocably in apertures in a block 26. The central parts of said apertures in the block 26 are enlarged, and in such enlarged portions, the punches 25 have thereon collars 27, restoring springs 28 encircling said punches 25, said springs being in compression between said collars 27 and the bottoms of the apertures. Beneath each punch 25 is a suitable die 29 mounted in a block 30 carried upon a support or table 31. An opening 32 permits the cut-out portion of the sheet to fall away therethrough.

Mounted upon the head 9 are a series of bent levers 33, conveniently carried upon a rod 35 which rod is mounted in brackets 34 on the head 9. The lowermost end of each lever 33 is in alinement with the left hand end (referred to in Fig. 2) of the member 23 of the corresponding gag or interponent. The other end of each bent lever 33 projects outwardly so as to contact in passing with a bar 37 carried by the frame of the machine, the surface of the bar 37 acting as a cam for the levers 33.

The head 9 is reciprocated upon the completion of each particular distance setting, and in the embodied mechanism the recording of the setting in the calculating machine 1 and the recording of the setting in the distance record device, by making the perforations in the strip, are effected simultaneously. The lever 40 of the calculating machine is the usual lever actuated to imprint or record within the machine the setting which has just been made. Upon the lever 40 is a contact or bridge piece 41 adapted to close the circuit between the terminals 42 and 43 connected respectively to the circuit wires 44 and 45, and operating mechanism for throwing in and out a clutch for shaft 15. The wires 44 and 45 are in circuit with a solenoid 46, the core 47 of said solenoid being pivotally connected to a lever 48, which lever is pivoted upon a bracket 49 carried by the frame 11. Said lever 48 is acted upon by a spring 50 normally acting to decenter the core 47 in the solenoid 46. Pivotally connected to the other end of the lever 48 is a pin 51 reciprocable in an aperture in the bracket 49. The other end of pin 51 works in a cam groove 52 in the clutch member 53. Said clutch member 53 is splined upon the shaft 15 and is urged to the left (referred to Fig. 1) by a spring 54, encircling the shaft 15, and acting between the clutch member 53 and a collar 55 fixed upon the shaft 15.

with detent hooks 105, which hooks engage stops 106, thus holding the hammers in retracted position against the tension of their respective springs 103. Formed on each of the bars 104 is a lug 107, and also on each of said bars is mounted a pivoted latch 108, said latches being constructed to give in one direction but being rigid in the other direction. Springs 112 hold bars 104, respectively, in operative position. Upon a shaft 109, fixed to arm 40, or 68, is a short arm 110 for each of the rods 104.

The embodied form of restoring means for the numeral carrier 90 comprises a spring 122 drawing the carrier back to initial or zero position. Means are likewise provided for holding the carrier in any position to which it may be set by one of the keys 2, such means as embodied comprising a pawl 121 coöperating with a ratchet 123 fixed to the arm 91. Pawl 121 is pivoted at 124, and the tail of the pawl has a pin and slot connection 125 with a pivoted rod 126, the other end of rod 126 being pivoted to an arm 127 fixed to shaft 109.

The manner of operation of the foregoing mechanism is substantially as follows:—

The hammers 100 being in retracted position, and the selected numeral bearing pins or types 96 having been set at printing position by the operation of the proper keys, as already described, the operator rocks lever 40, or 68. The shaft 109, through arms 110 acting against latches 108 (which are now rigid) lifts bars 104 clear of stop 106. The springs 103 cause the hammers 100 to strike the numeral pins which have been set in the printing position, thereby imprinting the numerals upon the paper or other receiving surface. The continuing movement of lever 40 or 68 causes arms 110 to engage their corresponding lugs 107, and thereby to draw the hammers 100 backwardly from the position shown in Fig. 7 to that shown in Fig. 6, the hooks 105 again engaging the stop 106.

When lever 40 is rocked to cause the perforation of the sheet by the selected punches, as already described, through each of the arms 127 and rods 126 the corresponding pawls 121 are lifted out of their ratchets 123 and the various carriers 90 are restored to the position of Fig. 6 by their springs 122. The pin and slot connection allows free action to the pawl 121 during the setting of the keys.

When the levers 40 and 68 are moved in the opposite direction, the arms 110 engage the corresponding pivoted latches 108, which now rock freely, permitting the arms 110 to pass back to the position shown in Fig. 6, preparatory to the next succeeding operation.

Suitable paper feeding means are shown, and as embodied herein the paper, or other impression receiving material 113, is carried upon an unwinding reel 114 and is wound upon a reel 115. The shaft of reel 115 is provided with a ratchet wheel 116 and coöperating therewith is a pawl 117 upon an arm 118. Arm 118 is connected by a pivoted rod 119 to lever 40 mounted upon shaft 109.

The manner of operation of the herein described mechanism is substantially as follows:

The operator of one of the calculating machines, say the machine 1, depresses or sets the keys corresponding to a given desired reading, and independently of him the operator of the machine 60 makes a corresponding setting upon that machine. Each operator is prevented by the screen 62 from noting the setting of the other machine, and each is compelled to work from his own blue-print, schedule or other source of dimensions, or distance readings. When a correct setting has been made by each operator, the lamp 61 will glow. If there is no glow of the lamp 61 at the completion of a setting, each operator knows that either he or the other operator has made an error, and each operator is referred to his own source of dimension reading to verify his own setting.

Figure 3:
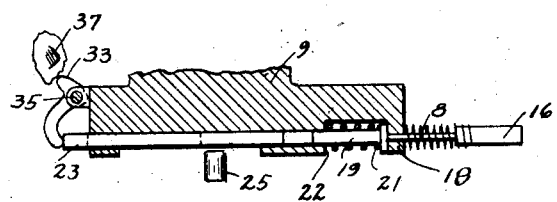
Fig. 3 is a fragmentary view, partly in section, of a punch gag or interponent and coöperating parts.
Figure 4:
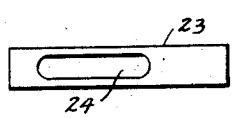
Fig. 4 is a plan of a portion of the gag shown in Figs. 2 and 3.

If no error has been made, or after such error has been corrected, the glowing of the lamp 61 indicates to each operator that he may operate the recording lever, namely the lever 40 upon the machine 1 and the lever 68, upon the machine 60. As soon as a correct setting in each dimension or distance denomination is made by each of the operators, the circuit is completed for each set key through the wires 6 and 7 to the corresponding solenoid 8. Upon the energizing of the solenoid 8 its core 16 is moved to the left (referred to Fig. 2). The two parts 19 and 23 of the gag or interponent corresponding to the solenoid are likewise moved to the left against the action of the spring 21. By such movement to the left the solid part of the member 23 is moved above the corresponding punch 25 (the slot 24 being above or in alinement with the corresponding punch 25 for all the unset keys of the key board). Thus when a key is depressed for the tens of feet, there will be a setting of the corresponding interponent member 23. Also when a key is depressed for the feet, the corresponding member 23 for the corresponding punch will likewise be set, and so on for inches and fractions of an inch. When the keys are restored or retracted, the circuits 6, 7 are deënergized with their corresponding solenoids 8, and the corresponding springs 21 decenter the solenoid cores 16 and carry the parts 19 of the gags or interponents to the right (referred to Fig. 3). The part 23 of each of the set interponents is left

MISSING PAGE TEMPORARY NOTICE

PATENT # 1241249   FOR ISSUE DATE 9-25-1917

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # pg. 5 the punches and the printing mechanism to print a number corresponding to the selected punches.

4. A machine for making distance record sheets for shape punching machines including in combination means for presenting a sheet to be punched, a series of punches each representing a distance value, a series of interponents corresponding to the punches, punch actuating mechanism comprising a shaft and a clutch, numeral printing mechanism, a keyboard having keys corresponding to the interponents and selecting corresponding numerals to be printed, electrical circuits controlled by the respective keys and electromagnetic means therein for selecting the corresponding interponents, and means subsequently operable by the operator for causing the selected punches to punch the sheet and the printing mechanism to print the corresponding number.

5. A machine for making distance record sheets for shape punching machines including in combination means for presenting a sheet to be punched, a series of punches each representing a distance value, a series of interponents corresponding to the punches, punch actuating mechanism comprising a shaft and a clutch, numeral printing mechanism, a keyboard having keys corresponding to the interponents and selecting corresponding numerals to be printed, electrical circuits controlled by the respective keys and electromagnetic means therein for selecting the corresponding interponents, and means subsequently operable by the operator for causing the selected punches to punch the sheet and the printing mechanism to print the corresponding number, said subsequently operable means comprising an electrical circuit and electromagnetic means for releasing the clutch.

In testimony whereof, I have signed my name to this specification, in the presence of two subscribing witnesses.

THEODORE P. PAYNE.

Witnesses:
ALAN M. JOHNSON,
JOHN D. MORGAN.

Copies of this patent may be obtained for five cents each, by addressing the "Commissioner of Patents, Washington, D. C."